United States Patent
Kejha

[11] Patent Number: 5,494,090
[45] Date of Patent: Feb. 27, 1996

[54] LIGHTWEIGHT PRESSURE-AIRLESS TIRE CONSTRUCTION

[75] Inventor: Joseph B. Kejha, Meadowbrook, Pa.

[73] Assignee: Electrion, Inc., Meadowbrook, Pa.

[21] Appl. No.: 178,427

[22] Filed: Jan. 7, 1994

[51] Int. Cl.[6] ........................................ B60C 7/00
[52] U.S. Cl. ..................... 152/310; 152/315; 152/328; 152/384
[58] Field of Search .................. 152/310, 311, 152/312, 315, 318–322, 323–328, 384

[56] References Cited

U.S. PATENT DOCUMENTS

| | | | |
|---|---|---|---|
| 1,396,515 | 11/1921 | McClevey | 152/384 |
| 1,841,773 | 1/1932 | Worsley et al. | 152/328 |
| 2,550,773 | 5/1951 | Christensen et al. | |
| 2,709,471 | 5/1955 | Smith et al. | |
| 2,713,373 | 7/1955 | Daugherty | 152/384 |
| 2,896,687 | 7/1959 | Smith et al. | |
| 3,022,810 | 2/1962 | Lambe | |
| 4,169,494 | 10/1979 | Kubica et al. | 152/310 |
| 4,894,281 | 1/1990 | Yagi et al. | 428/286 |

FOREIGN PATENT DOCUMENTS

| | | | |
|---|---|---|---|
| 59258 | 11/1941 | Denmark | 152/328 |
| 2748886 | 5/1979 | Germany | 152/320 |

*Primary Examiner*—Geoffrey L. Knable

[57] ABSTRACT

A lightweight, filler core tire construction for automobiles and other vehicles, having a flexible composite outer layer structure and a flexible honeycomb core bonded to said outer layer, eliminating pressurized air from the tire and increasing thus the safety of driving and the damage resistance and eliminating the servicing of the tire. The structures above are preferably made from a polyurethane polymer and various fibers.

36 Claims, 3 Drawing Sheets

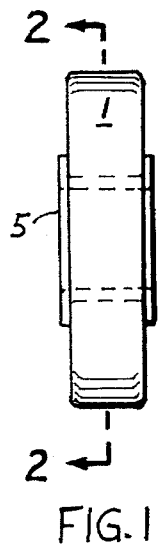
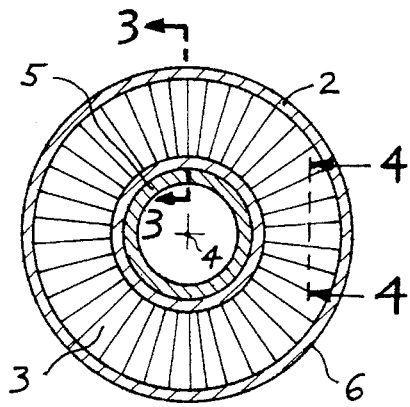
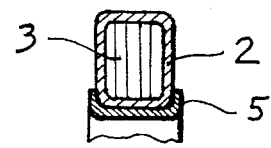
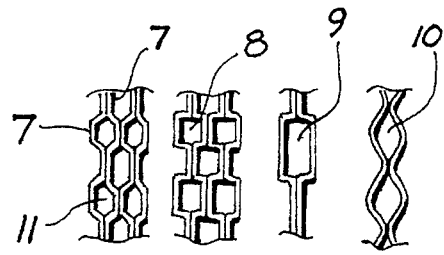
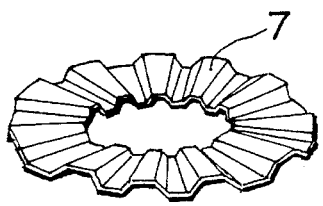
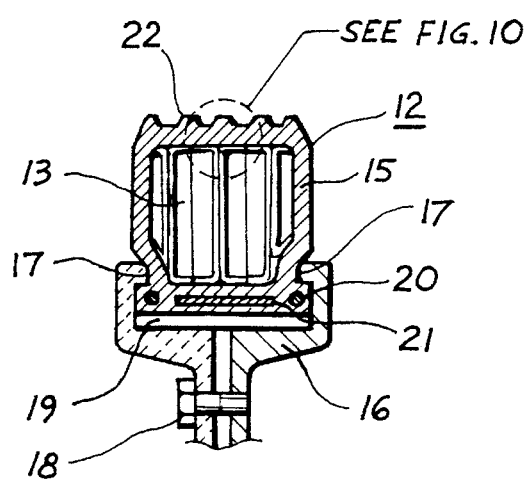
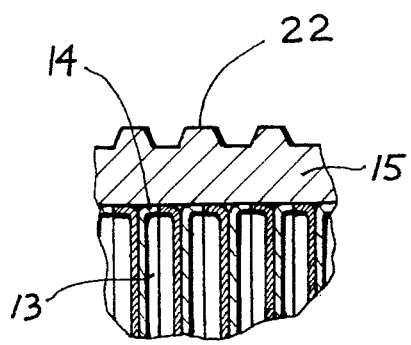

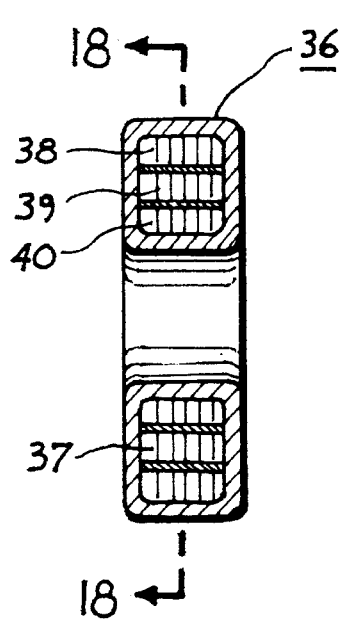
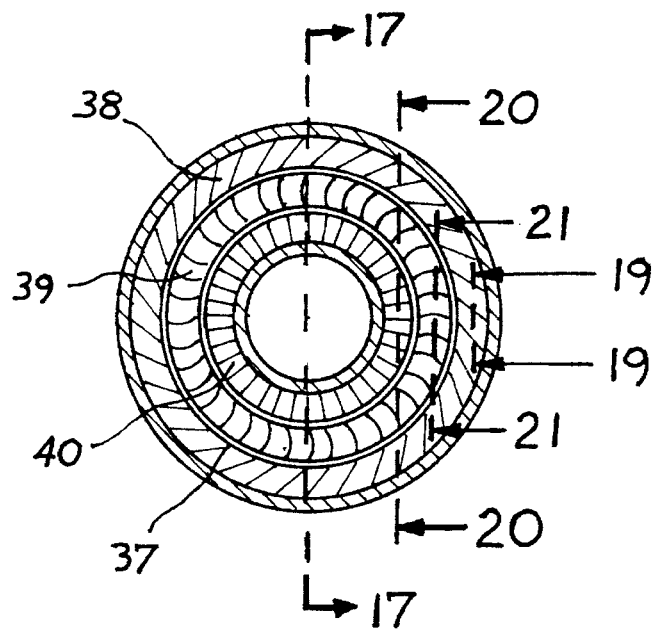
FIG. 17        FIG. 18
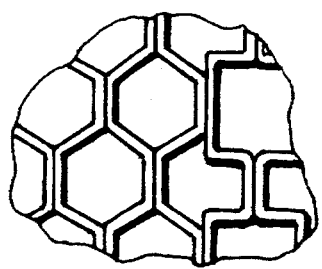
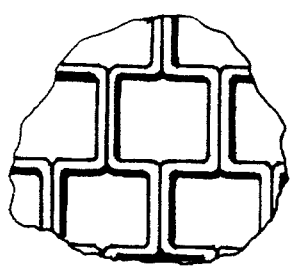
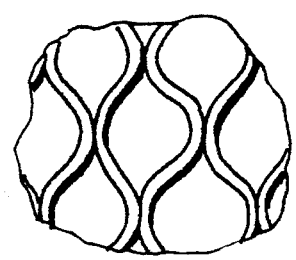
FIG. 19     FIG. 20     FIG. 21

LIGHTWEIGHT PRESSURE-AIRLESS TIRE CONSTRUCTION

BACKGROUND OF THE INVENTION

1. Field of the Invention

The subject invention generally pertains to non-pressurized, filler core tire construction for automobiles and various utility vehicles, which replaces the pressurized air in the tire by a lightweight and flexible filler material of a honeycomb construction, increasing thus the safety of driving, damage resistance, and eliminating the servicing of the tire.

2. Description of Related Art

In the prior art the wheel tires for automobiles and other vehicles are filled with pressurized air to absorb the shocks of the road or are filled with a sponge-like elastic foam or a solid elastic rubber or a polymer to do the same, as described in U.S. Pat. Nos. 3,022,810 and 2,709,471 and 2,550,773.

U.S. Pat. No. 3,022,810 discloses a tire being inflated by means of medium comprising a closed cell, gas pressurized rubber foam.

U.S. Pat. No. 2,709,471 discloses a solid tire, which is is easily mounted and dismounted and fits tightly on a wheel without slippage.

U.S. Pat. No. 2,550,773 discloses a tire having a shock resistant, puncture-sealing, pneumatic construction which includes a plurality of shock resistant pillars.

While the pressurized-air filled tires are adequate for most applications and are relatively lightweight, they are also very dangerous during a blow-out or a flat, causing many accidents and require servicing.

The foam filled or solid rubber tires are useable only for slow moving utility vehicles and they are also usually very heavy and do not absorb the shocks properly. They also do not last long enough to be competitive. They are used sometimes as the spare tires.

The lightweight and safer, non-pressurized tire construction of the invention does not suffer from the prior art problems and provide many positive advantages.

SUMMARY OF THE INVENTION

It has now been found that a lightweight and safer, damage resistant, non-pressurized core tire construction can be made by replacing the pressurized air in the tire with a filler material, made from a flexible, elastic, preferably hexcell honeycomb or any shape cell honeycomb construction and preferably from a polyurethane polymer and preferably reinforced with various fibers. The above filler material can be engineered into any desired density, pressure resistance and flexibility and thus to any energy absorption rate, while still being lightweight and fatigue resistant.

The principal object of the invention is to provide a wheel tire construction for automobiles and other vehicles, which is safer than the prior art tires and which is lightweight.

A further object of the invention is to provide a wheel tire construction for automobiles and other vehicles which is easy to manufacture and has a long useful life.

A further object of the invention is to provide a wheel tire construction for automobiles and other vehicles which is damage resistant.

A further object of the invention is to provide a wheel tire construction for military vehicles.

A further object of the invention is to provide a wheel tire construction for automobiles and other vehicles, which does not require servicing.

A further object of the invention is to provide a wheel tire construction for electric vehicles.

Other objects of the invention and its advantageous features will be apparent from the description and claims.

BRIEF DESCRIPTION OF THE DRAWINGS

The nature and characteristic features of the invention will be more readily understood from the following description taken in connection with the accompanying drawing forming part hereof in which:

FIG. 1 illustrates a front plan view of a tire of the invention.

FIG. 2 is a vertical sectional view taken approximately on the line 2—2 of FIG. 1, showing the "star" like orientation of the honeycomb core cells in the core structure, according to the subject invention.

FIG. 3 is a vertical sectional view taken approximately on the line 3—3 of FIG. 2, showing the outer layer structure and the core, according to the subject invention.

FIG. 4 is a partial sectional view taken approximately on the line 4—4 of FIG. 2, showing the construction of the hexagonally shaped cells from washer-like layers, according to the subject invention.

FIG. 5 illustrates the square cells construction from washer-like layers, according to the subject invention.

FIG. 6 illustrates the rectangular cells construction from washer-like layers, according to the subject invention.

FIG. 7 illustrates the rounded cells construction from washer-like layers, according to the subject invention.

FIG. 8 illustrates a single corrugated washer-like layer of the honeycomb core, according to the subject invention.

FIG. 9 illustrates a partial sectional view of a tire with rim attachments, according to the subject invention.

FIG. 10 is an enlarged partial and sectional view of the flange joints between the outer layer structure of the tire and the cells of the core, according to the subject invention.

FIG. 17 illustrates multiple radial layers of the cells in the honeycomb core of a tire, with various configurations of the cells and various sectional shapes of the cells combined, according to the subject invention.

FIG. 18 is a vertical sectional view taken approximately on the line 18—18 of FIG. 17, showing several radial layers of the cells in the core, having various configurations, according to the subject invention.

FIG. 19 is a partial sectional view taken approximately on the line 19—19 of FIG. 18, showing various sectional shapes of the the cells combined in this particular layer.

FIG. 20 is a partial sectional view taken approximately on the line 20—20 of FIG. 18, showing square sectional shape of cells in this particular layer.

FIG. 21 is a partial sectional view taken approximately on the line 21—21 of FIG. 18, showing rounded sectional shape of cells in this particular layer.

Like numerals refer to like parts throughout the several views.

DESCRIPTION OF THE PREFERRED EMBODIMENTS

Figure 11:
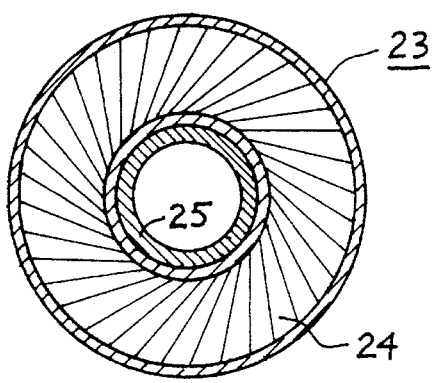
FIG. 11 illustrates a tangential configuration of the honeycomb core cells in a tire, in relation to the rim of the wheel, according to the subject invention.

When referring to the preferred embodiments, certain terminology will be utilized for the sake of clarity. Use of such terminology is intended to encompass not only the described embodiment, but also all technical equivalents which operate and function in substantially the same way to bring about the same result.

The invention was generally described in my disclosure document No. 299891 filed on Jan. 10, 1992.

Referring now in more detail particularly to the drawings of this patent and FIGS. 1, 2 and 3 thereof, one embodiment of the non-pressurized tire 1 of the invention comprises, an outer flexible layer structure 2 made of a polyurethane polymer matrix reinforced with various fibers, which may be ultrahigh molecular weight polyethylene fibers, steel fibers or other fibers (not shown) and said outer layer structure 2 is filled with an elastic honeycomb cell core structure 3, which has the cells formed into a "star" configuration as shown in FIG. 2, directed longitudinally approximately from the center 4 of the wheel rim 5 to the outside circumferential surface 6 of the tire and may be evenly spaced and having a conical shape. This core structure 3 may be engineered and manufactured into any desired density, pressure resistance and flexibility and thus any desired energy absorption rate, while still being lightweight.

The hexcell honeycomb is the most lightweight core construction known in the structural applications and in the construction of the tire of the invention may be formed from a plurality of corrugated washer-like sheets 7 (or their segments) as shown in FIG. 8, stocked on top of each other and bonded or welded together as shown in FIG. 4, which is a partial and enlarged sectional view "4—4," and which are another embodiments of the invention. Each pair of sheets 7 forms cells therebetween, which have two parallel sides, as shown in FIGS. 3 through 7. The resulting conical shape of the cells, with the larger sectional area at the outside circumferential surface 6 of the tire and with the smaller sectional area at the rim 5 of the wheel makes the core structure 3 also denser and stiffer at the rim 5 and thinner and softer at the outside circumferential surface 6 of said tire, which is very desirable.

In another embodiment of the invention, the corrugation of the sheets 7 and resulting sectional profile of the cells may have also a square shape 8 as shown in FIG. 5, a rectangular shape 9 as shown in FIG. 6 or a rounded shape 10 as shown in FIG. 7, or any desired shape, but the hexagonal shape 11 and/or the rectangular shape 9 are preferred. Said core structure 3 is bonded to the outer layer structure 2.

Now referring additionally to FIGS. 9 and 10, which are another embodiments of the invention, showing a partial sectional view of a tire 12, the ends of the cells of the core structure 13 may have flanges 14 as shown in FIG. 10 and said flanges may be part of the cells material continuously. This improves the bonding or welding of the cell material oft he core structure 13 to the outer layer structure 15 of the tire and thus better distributes the joint stress loads from the outer layer structure 15 of the tire into said cells, during a ride or standing of the tire.

The circumferential surface of the tire 12 at the rim 16 may have built-in side grooves 17, to be trapped by a split, two-part wheel rim 16, held together by bolts 18 and also it may have substantially axial serrations or spline teeth 19 on its surface to be matched by substantially axial serrations or teeth on the surface of the rim 16 for a torque load transfer between said rim and said tire. Said tire may have also the metal rings 20 and or belt 21 embedded in the vicinity of the rim 16 for a reinforcement. Said grooves 17 transfer side loads on the tire 12 into the rim 16. The tire 12 may be stretched (pre-loaded) onto said rim 16 to improve the friction and thus connection to said rim. The tire 12 may be also bonded to the rim 16.

The outer layer structure 15 of the tire is to be thoroughly adhesively bonded or welded to the honeycomb filler core structure 13 all around. The honeycomb filler core structure 13 resists radial and axial (cornering) loads on the tire, but flexes as is desired and is engineered for, to absorb the shocks and the outer loads from the road.

Said outer layer structure 15 and said core structure 13 may be made also from other elastic materials, including rubber, but a polyurethane elastic polymer is preferred. All said materials may also contain a carbon filler or other fillers (not shown).

In addition, the same, or substantially similar materials should be used for the core structure 13 and the outer layer structure 15 construction, to improve bonding together.

The bonding may be done by an adhesive (not shown), fusion bonding, or by various welding methods, including an ultrasound welding method. Said filler core material may be also reinforced with various fibers and or fillers (not shown). The outside circumferential surface of the tire 12 may also have a tread 22.

Now referring additionally to FIG. 11, which is another embodiment of the invention, illustrates the sectional view of a tire 23 and said tire may have the cells in the flexible honeycomb core structure 24 positioned in a tangential configuration in relation to the rim 25 of the wheel. This configuration results in a more flexible tire.

Figure 12:
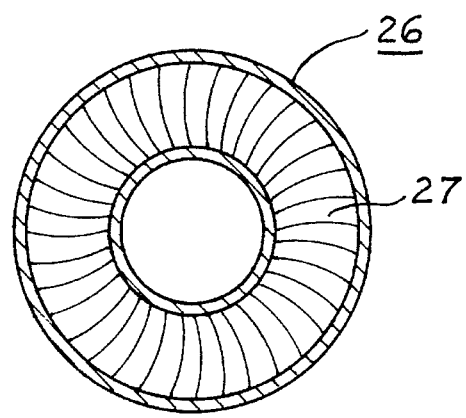
FIG. 12 illustrates a curved configuration of the honeycomb core cells, according to the subject invention.

The FIG. 12, which is another embodiment of the invention, illustrates a sectional view of a tire 26 and said tire may have the shape of the cells in the flexible honeycomb core structure 27 curved, but substantially in a "star" configuration as described above and as shown. The shape of the curves may be geometrically constructed, such as a parabolic shape and other shape curves, or may be any free shape created, including "S" shape and multiple "S" shapes, which will result in bellow-like cells (not shown).

Figure 13:
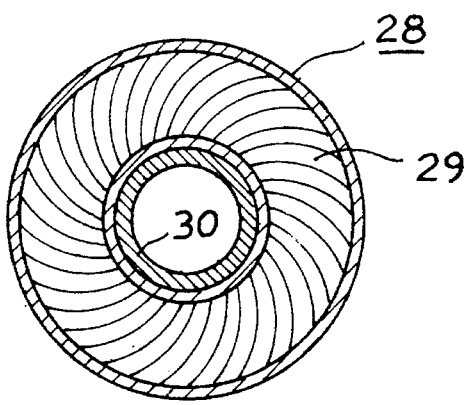
FIG. 13 illustrates a tangential, curved configuration of the honeycomb core cells, according to the subject invention.

In another embodiment of this invention, which is shown in FIG. 13, as a sectional view of a tire 28, there may be also a combination of the tangential and the curved configurations of the cells in the flexible honeycomb core structure 29 resulting in a tangential, curved configuration of the cells in relation to the rim of the wheel 30.

Figure 14:
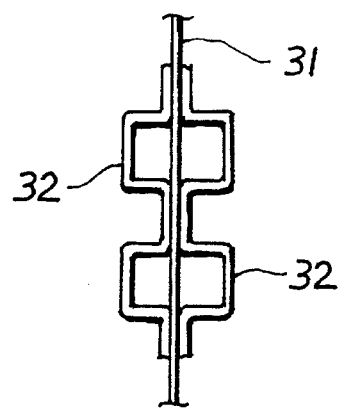
FIG. 14 illustrates a "half cell" construction of the honeycomb core with a flat washer inserted between the corrugated washers, according to the subject invention.

The FIG. 14, which is another embodiment of the invention, illustrates a "half cell" construction of the honeycomb core. The flat washers 31 may be inserted between corrugated washers 32 and bonded together.

Figure 15:
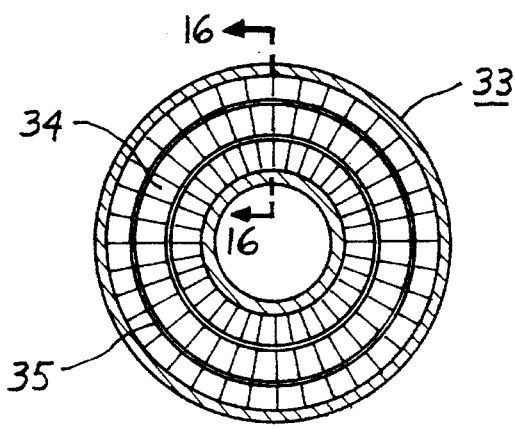
FIG. 15 illustrates multiple radial layers of the cells in the honeycomb core, according to the subject invention.
Figure 16:
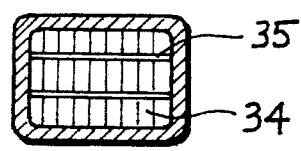
FIG. 16 is a vertical sectional view taken approximately on the line 16—16 of FIG. 15, showing several radial layers of the cells in the core of a tire, according to the subject invention.

FIGS. 15 and 16, which are another embodiments of the invention, illustrate the sectional views of a tire 33 which may have the core constructed from more than one radial layer 34 of cells, separated be radial belts 35. All said layers and belts are bonded together.

In another embodiment of the invention, shown in FIGS. 17, 18, 19, 20 and 21 as sectional views of a tire 36, various sectional cell shapes and configurations of cells may be combined to form a honeycomb core 37 and its radial layers of cells 38, 39, and 40, which may be in any sequence and in any quantity desired to customize the flexibility and energy absorption of the tire. The square and rectangular cells are stiffer to side (axial) loads on the tire.

The wheel tires as described above are also very damage resistant, which make them useable for military vehicles and other heavy duty vehicles.

Said tires can be engineered for higher stiffness and hardness by appropriate selection of harder elastic materials for honeycomb construction or selection of cells sizes and their wall gages or both, to increase the honeycomb density and stiffness, to achieve lower rolling resistance and thus make them applicable for electric vehicles and high mileage range vehicles.

Said tires also do not require servicing to maintain air pressure and have a longer useful life, due to excellent wear resistance of the polyurethane, ultrahigh molecular weight polyethylene fibers and carbon fillers. The safety is enhanced by the absence of the high pressure air in said tires and thus having no chance of a flat or blow out.

It should of course be understood, that the description and the drawings herein are merely illustrative and various modifications, changes and combinations of the embodiments disclosed can be made without departing from the spirit of the invention and scope of the appended claims.

It will thus be seen that safer, lightweight, pressure-airless and damage resistant tire construction has been provided with which the objects of the invention are achieved.

I claim:

1. A tire construction for automobiles and other vehicles comprising:
   an outer elastic layer structure and an inner elastic filler core material, which has an elastic honeycomb cells construction and is bonded to said outer elastic layer structure,
   said filler core material has conically shaped honeycomb cells with two parallel sides and which cells are lengthwise oriented substantially in the direction from the center of said tire to the outside circumferential surface of said tire,
   and in which said honeycomb cells are formed from corrugated washer layers which are bonded together.

2. A tire construction as described in claim 1, in which said honeycomb material has curved shape cells substantially lengthwise oriented in direction from the center of the wheel to the outside circumferential surface of said tire.

3. A tire construction as described in claim 1, in which said honeycomb material has curved shape cells substantially lengthwise oriented in a tangential relationship to the wheel rim.

4. A tire construction as described in claim 1, in which said outer elastic layer structure is made from a composite of a polyurethane polymer and fibers.

5. A tire construction as described in claim 4, in which said fibers are ultrahigh molecular weight polyethylene fibers.

6. A tire construction as described in claim 4, in which said fibers are steel fibers.

7. A tire construction as described in claim 1, in which said honeycomb core is made from a polyurethane polymer.

8. A tire construction as described in claim 1, in which said honeycomb core is made from a composite of a polyurethane polymer and fibers.

9. A tire construction as described in claim 8, in which said fibers are ultrahigh molecular weight polyethylene fibers.

10. A tire construction as described in claim 1, in which said outer elastic layer structure is made from a composite of a rubber and fibers.

11. A tire construction as described in claim 10, in which said fibers are ultrahigh molecular weight polyethylene fibers.

12. A tire construction as described in claim 10, in which said fibers are steel fibers.

13. A tire construction as described in claim 1, in which said honeycomb core is made from a rubber.

14. A tire construction as described in claim 1, in which said honeycomb core is made from a composite of a rubber and fibers.

15. A tire construction as described in claim 14, in which said fibers are ultrahigh molecular weight polyethylene fibers.

16. A tire construction as described in claim 1, in which said honeycomb core is made from an elastic material reinforced with fibers.

17. A tire construction as described in claim 1, in which said elastic outer layer structure contains a filler material.

18. A tire construction as described in claim 17, in which said filler material is carbon.

19. A tire construction as described in claim 1, in which said honeycomb core material contains a filler material.

20. A tire construction as described in claim 19, in which said filler material is carbon.

21. A tire construction as described in claim 1, in which at least one of said bondings is done by welding.

22. A tire construction as described in claim 21, in which said welding is an ultrasound welding.

23. A tire construction as described in claim 1, in which at least one of said bondings is done by an adhesive.

24. A tire construction as described in claim 1, in which said honeycomb core has cells of a hexagonal cone shape.

25. A tire construction as described in claim 1, in which said honeycomb core has cells of a square cone shape.

26. A tire construction as described in claim 1, in which said honeycomb core has cells of a rectangular cone shape.

27. A tire construction as described in claim 1, in which said honeycomb core has cells of a rounded cone shape.

28. A tire construction as described in claim 1, in which said honeycomb core has various shapes of cells combined.

29. A tire construction as described in claim 1, in which said outer elastic layer has a tread on the largest circumferential surface of said tire.

30. A tire construction as described in claim 1, in which said outer elastic layer has two side circumferential grooves in the vicinity of the inner circumferential surface of said tire, matching a two part rim of a wheel.

31. A tire construction as described in claim 30, in which said outer elastic layer has two metal wire radial reinforcing rings embedded in the vicinity of said grooves.

32. A tire construction as described in claim 1, in which said outer elastic layer structure has a radial reinforcing belt embedded in the inner circumferential layer of said tire adapted to face the wheel rim.

33. A tire construction as described in claim 1, in which said honeycomb core consists of a plurality of annular layers of cells.

34. A tire construction as described in claim 1, in which said outer elastic layer structure is bonded to a wheel rim.

35. A tire construction as described in claim 1, in which at least one of said bondings is fusion bonding.

36. A tire construction as described in claim 1, in which said vehicles are utility vehicles, military vehicles, electric vehicles, and high mileage range vehicles.

* * * * *